UNITED STATES PATENT OFFICE.

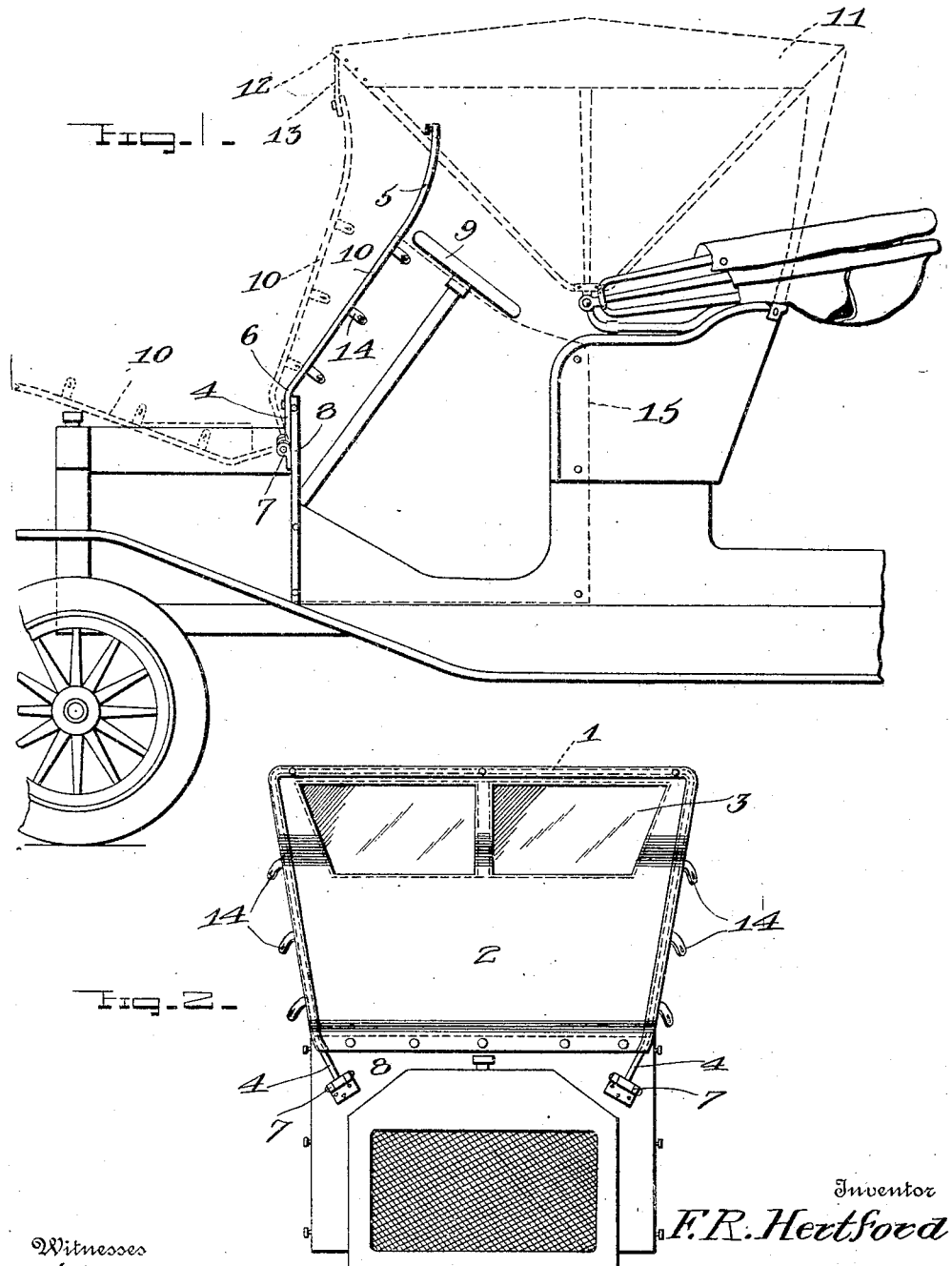

FREDERICK R. HERTFORD, OF WASHINGTON, DISTRICT OF COLUMBIA.

SHIELD.

982,492.

Specification of Letters Patent. Patented Jan. 24, 1911.

Application filed June 13, 1910. Serial No. 566,561.

*To all whom it may concern:*

Be it known that I, FREDERICK R. HERTFORD, a citizen of the United States, residing at Washington, in the District of Columbia, have invented new and useful Improvements in Shields, of which the following is a specification.

This invention relates to improvements in shields for automobiles and other vehicles, and more particularly to a detachable combined wind and rain shield.

It is the object of this invention to construct a combined wind and rain shield which may be readily attached or removed from the dashboard of an automobile, and in its normal position it will be in an inclined relation to the direction of travel, so that the pressure of the contacting air will be directed upward over the driver's head. A fixed inclined wind shield possessing these qualities usually forms an obstruction to the driver's entering or leaving the automobile and it is a further object of this invention to so construct this shield that it may be readily moved out of the way in entering or leaving the automobile and will assume its normal position thereafter.

It is also the object of this invention to so construct the shield that when the automobile is provided with a cover and the cover raised, the shield may be secured in an upright position by attaching the under side to the top of the cover and thereby providing a rain shield.

It is still a further object of the invention to so connect the shield to the automobile that when it is desired to positively remove the shield from in front of the driver it may be folded down over in front of the hood.

Wind shields which are rigidly carried upon the dashboard and slope rearwardly to a point above the steering wheel form an obstruction to the free entry or leaving, and are therefore a cause of inconvenience to the driver. When the automobile is provided with a top and the top is raised, the inconvenience is greatly increased as the usual side supports extending to the front of the top necessitate a person entering the front seat to squeeze in between the supports and a stationary shield.

While the preferred form of this invention is illustrated in the accompanying sheets of drawing, yet it is to be understood that minor detail changes may be made without departing from the scope thereof.

Figure 1 is a view in side elevation of an automobile to which this invention has been applied, showing the normal position of the shield in full lines, and in dotted lines in upright position when the top is raised and also the position assumed when folded forward over the hood. Fig. 2 is a view in front elevation of the construction shown in Fig. 1, illustrating the shield in its normal position.

The shield comprises a frame 1 and a covering 2 preferably made of leather, rubber or other suitable material having windows 3 of celluloid or some transparent substance in the top thereof to prevent obstruction to the driver's vision. This covering is stretched over a rectangular frame 1 of metal preferably in the form of a bar bent at an angle at each of the upper corners and converging toward the bottom with the lower extremities 4 pivoted to the front of the dashboard. As seen in full lines in Fig. 1, each side of the frame is slightly curved, the top 5 being curved upwardly and outwardly, while the bottom 6 being curved downwardly and inwardly. The bottom is pivoted by a hinge 7 to the front of the dashboard 8 a short distance below the top, so that the sides of the frame resting upon the top of the dashboard will retain the shield in the normal position with the top in proximity to, but not in contact with the steering wheel 9. The rearward inclination of the main body 10 of the shield will deflect the air encountered in an upward direction and the upward and outward curved portion 5 will cause the air so directed to pass in a current above the head of the driver. If the shield were rigidly secured in this position it would be very inconvenient for the driver to enter or leave, but as it is hinged to the dashboard the driver may raise the shield with one hand as he is entering or leaving without any inconvenience to him. If desired a spring may be applied at the hinged portion, so that the screen will be positively returned to the normal position when released.

Some automobile tops are made without the forward side braces to the front of the top but it is preferable to retain these side braces to the top for many reasons, and most of the automobile tops are supplied with such braces.

By referring to the raised cover 11 shown in dotted lines upon Fig. 1, it is obvious that with the wind shield in its normal position it would almost be impossible to enter the car without great inconvenience to the driver, unless the shield were hinged, as shown, and thereby allow the driver to move the top of the shield forward out of his way as he enters or leaves. When desired the shield may be secured at its top under the front 12 of the cover 11 by straps 13, as shown in dotted lines in Fig. 1, to provide a rain shield. When speeding or when it is not desired to use the shield it may be folded forward its hinges and will lie over the hood. From its shape and curved top the pressure of the contacting air will hold it in this position. The sides of the shield may be provided with straps 14 for the purpose of attaching a side cover 15 thereto, as illustrated in dotted lines in Fig. 1.

When the automobile is provided with a straight dashboard it is only necessary to secure the stationary part of the hinge to the front of the dashboard in the proper position, and the shield may be attached or detached at will. By the shape of the side members of the frame the shield will normally be supported in the inclined position by the engagement of the side members with the top of the dashboard. It is therefore seen that it is not necessary in such a case to secure additional parts to the dashboard in applying this shield. Where the top of the dashboard curves inwardly the same result may be accomplished by placing the hinges lower down upon the dashboard, or, if desired, a small stationary bracket may be secured at each side on the front of the curved dashboard to form a continuation of the vertical part thereof for engagement with the side members of the shield frame.

What I claim is:—

1. A shield for automobiles having a wind deflecting surface and rigid side members hinged at their lower extremities to the front of the dashboard and having a shoulder above the pivotal point to engage the top of the dashboard to normally support the shield in a rearwardly inclined position, the body of said shield adapted to be moved forward out of the way in entering and leaving the front seat.

2. A combined wind and rain shield for automobiles provided with a cover, said shield having a wind deflecting surface, side members hinged at their lower extremities to the front part of the dashboard and curved above the pivotal point to engage the top of the dashboard to normally support the shield in a rearwardly inclined position, and means upon the top of the shield to secure the same to the top of the raised cover.

FREDERICK R. HERTFORD.

Witnesses:
MATTIE J. HUBBS,
CARRIE REDEKER.